United States Patent [19]

Koizumi et al.

[11] 4,135,491

[45] Jan. 23, 1979

[54] DWELLINGS EQUIPPED WITH A ROOM-HEATING DEVICE AND HOT WATER FEEDER BASED ON SOLAR HEAT

[75] Inventors: Hisao Koizumi, Zushi; Yoshinosuke Kawada, Yokohama; Sadao Fujimura, Tokyo, all of Japan

[73] Assignees: Tokyo Shibaura Electric Co., Ltd., Kawasaki; Toshiba House Living Industry Co., Ltd., Tokyo, both of Japan

[21] Appl. No.: 753,824

[22] Filed: Dec. 23, 1976

[30] Foreign Application Priority Data

Dec. 26, 1975 [JP] Japan .................. 50-158584

[51] Int. Cl.$^2$ ............................................. F24J 3/02
[52] U.S. Cl. ......................... 126/270; 237/1 A; 126/271
[58] Field of Search ............... 126/270, 271; 237/1 A

[56] References Cited

U.S. PATENT DOCUMENTS

| | | | |
|---|---|---|---|
| 2,559,869 | 7/1951 | Gay | 126/270 X |
| 2,680,565 | 6/1954 | Löf | 126/270 X |
| 3,250,269 | 5/1966 | Sherock | 126/271 |
| 3,902,474 | 9/1975 | Pyle | 126/271 X |
| 3,918,430 | 11/1975 | Stout et al. | 126/271 |
| 3,937,208 | 2/1976 | Katz et al. | 237/1 A X |
| 3,973,522 | 8/1976 | Ervin, Jr. | 126/400 X |
| 3,974,822 | 8/1976 | Patil | 126/271 |
| 3,994,276 | 11/1976 | Pulver | 126/270 |
| 4,019,494 | 4/1977 | Safdari | 126/270 |
| 4,029,258 | 6/1977 | Groth | 126/270 |

FOREIGN PATENT DOCUMENTS 143621 12/1961 U.S.S.R. ...................... 126/271

Primary Examiner—William F. O'Dea
Assistant Examiner—Larry Jones
Attorney, Agent, or Firm—Oblon, Fisher, Spivak, McClelland & Maier

[57] ABSTRACT

A dwelling includes a hot air type solar heat collector for heating rooms and a hot water type solar heat collector for supplying hot water. The former is fitted in that portion of the roofing which is positioned above the dwelling body, while the latter is provided in that portion of the roofing which extends outward over the outer wall of the dwelling body.

7 Claims, 5 Drawing Figures

DWELLINGS EQUIPPED WITH A ROOM-HEATING DEVICE AND HOT WATER FEEDER BASED ON SOLAR HEAT

BACKGROUND OF THE INVENTION

1. Field of the Invention

This invention relates to dwellings equipped with a room-heating device and hot water feeder based on solar energy.

The known room-heating device based on solar heat includes a hot water type with water used as a heat-transferring medium and a hot air type with air used as a heat-transferring medium.

2. Description of the Prior Art

The former type heats water by solar heat accumulated in a heat collector built in the roofing of a dwelling, and circulates hot water through the rooms for heating. This device can be utilized as a hot water feeder which enables hot water to be applied not only in room heating but also in cooking and washing. Water used as a heat transferring medium has a large heat capacity and can render the subject device considerably compact. However, this hot water type device has the drawback that if water leaks from a water-circulating system set on the roofing of a dwelling, the ceilings, walls, matting and furniturs, etc will possibly be wetted by said leaking water. Further, where a single heat collector is concurrently used for room heating as well as for supply of hot water, the operation of such heat collector should be properly changed over according to the object intended. The reason is that in winter, both room heating and supply of hot water are required, whereas, in summer, only supply of hot water is needed and room heating rather leads to great inconvenience. Therefore, this type of heat collector is defective in that the structure and handling become unavoidably complicated.

Though free from the above-mentioned difficulties, the latter type which heats air by a heat collector still has the drawback that air used as a heat-transferring medium has a small heat capacity, making it necessary to use a large size apparatus.

SUMMARY OF THE INVENTION

It is accordingly the object of this invention to provide a dwelling equipped with a room-heating device and hot water feeder, in which a room-heating hot air type heat collector is provided in that portion of the roofing which is positioned above the inside of a dwelling body including, for example, living rooms and a hot water type solar heat collector is set in the eaves portion of the roofing which extends outward over the outer walls of the dwelling body, offering the advantage of preventing, for example, furniture from being damaged by water leaking from a hot water type solar heat collector, decreasing a requirement of hot air piping and attaining an easy changeover of operation of both heat collectors in winter and summer.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENT

There will now be described by reference to the appended drawings a dwelling embodying this invention which is equipped with a room-heating device and a hot water feeder based on solar heat.

Figure 1:
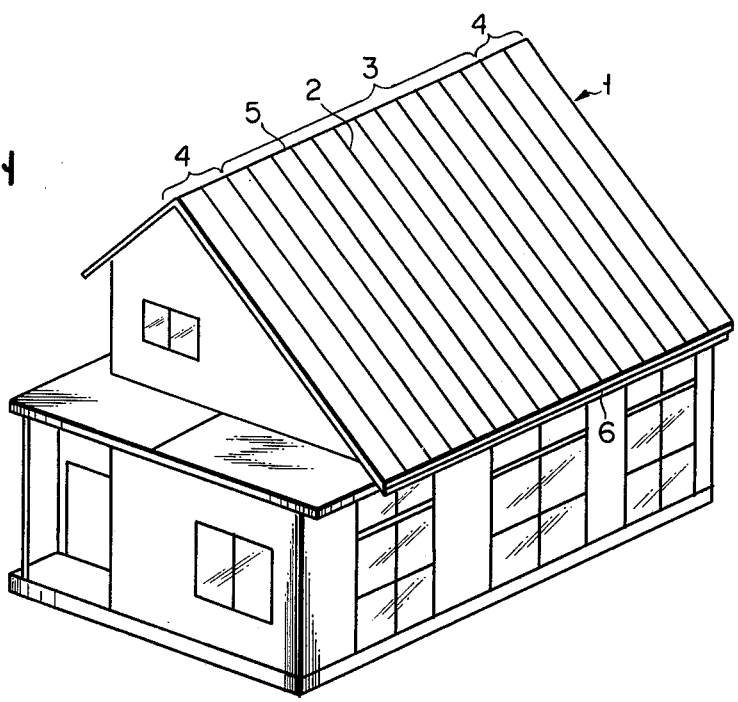
FIG. 1 is an oblique view of a dwelling embodying this invention which is equipped with room-heating and hot water-feeding devices based on solar heat.

Referring to FIG. 1, reference numeral 1 shows the whole of a dwelling. Reference numeral 2 denotes roofing covering the main body of the dwelling 1. That portion of the roofing 2 which faces the south is fitted with heat collecting system comprising one hot air type solar heat collector 3 and two hot water type solar heat collectors 4. The hot air type solar heat collector 3 is set in that portion of the roofing which lies above the dwelling body including living rooms and formed of a large number of parallel arranged narrow solar heat-collecting units 3a extending along the inclined plane of the roofing from a ridge 5 to eaves 6.

Figure 2:
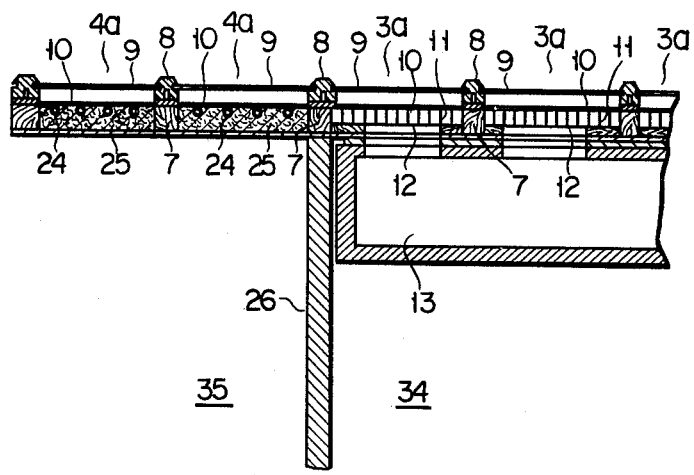
FIG. 2 is a cross-section of part of the dwelling of FIG. 1, showing the arrangement of a hot water type solar heat collector and a hot air type solar heat collector.
Figure 3:
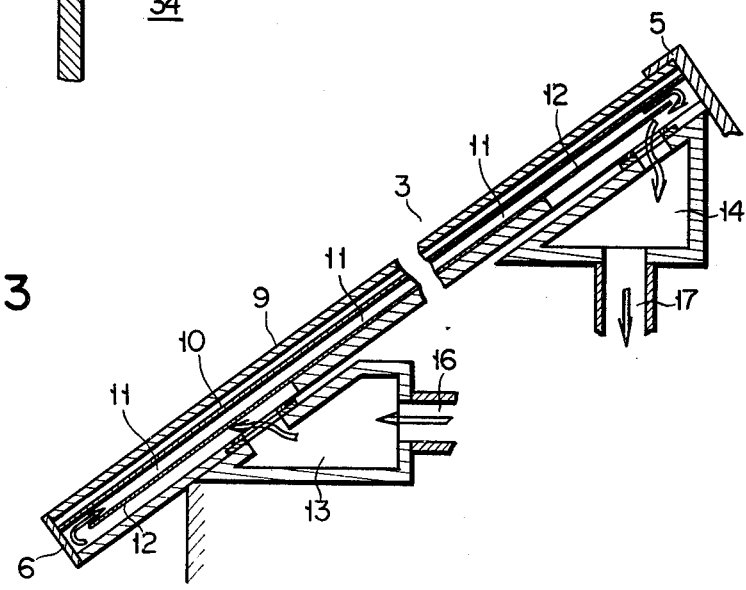
FIG. 3 is a longitudinal sectional view of the hot air type solar heat collector of FIG. 2.
Figure 4:
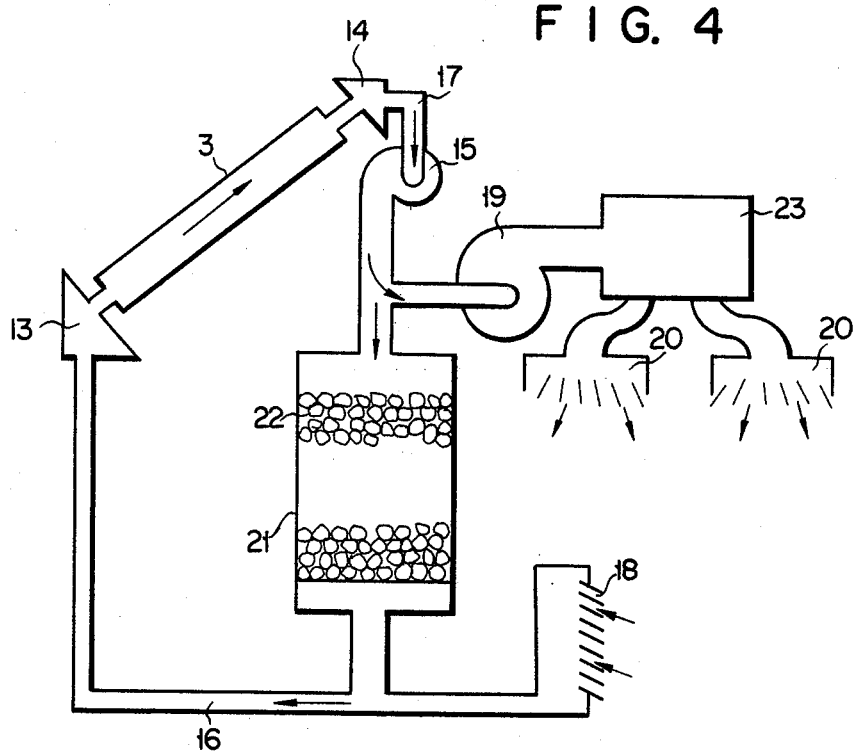
FIG. 4 schematically illustrates a hot air type room-heating system.

The solar heat-collecting units 3a constituting the hot air type solar heat collector 3 are positioned, as shown in FIG. 2, between a plurality of rafters 7 extending from the ridge 5 to the eaves 6 in parallel at a prescribed space. The top surface of the rafters 7 is fitted with a metal sash 8 made of, for example, aluminum. Transparent plates 9 formed of glass or plastic material are placed between the respective sashes 8 in a liquid-tight state to prevent rain from being carried between the rafters 7. A plurality of solar heat-collecting plates 10 are provided immediately under the transparent plates 9 in parallel at a prescribed space. The solar heat-collecting plates 10 are formed of metal sheets painted in black on the outside to absorb a large amount of solar heat. The backside of the solar heat-collecting plates 10 is provided with a large number of fins 11 extending in parallel along the inclined plane of the roofing, thereby effectively heating air flowing along the backside of said heat collecting plates 10. Solar heat-collecting sections formed of the transparent plates 9 and solar heat-collecting plates 10 extend from the ridge 5 to the eaves 6 in narrow strips. This arrangement facilitates the work of preventing the intrusion of rain and fitting both hot air and hot water type solar heat-collecting devices to a dwelling. Metal partition plates 12 are provided below the fins 11. A large number of narrow passages which are defined by the solar heat-collecting plates 10, fins 11 and partition plates 12 and extend from the ridge 5 to the eaves 6 collectively act as a guide for conducting flowing air. Air is brought into the passages from an air feeding chamber 13 shown in FIG. 3. Air heated while running through the passages is drawn off from a heated air-collecting chamber 14. The air feeing chamber 13 extends along that portion of the underside of the roofing which is disposed near the eaves 6. The air feeding chamber 13 distributes an equal amount of air carried through a duct 16 by a first blower 15 shown in FIG. 4 to the solar heat-collecting units 3a. That portion of the air feeding chamber 13 which faces the underside of the roofing 2 is inclined in the same degree as the roofing 2. The air inlets of the solar heat collecting units 3a communicate through packing with an opening provided in said inclined plane of the air feeding chamber 13. The heated air collector 14 extends along the ridge 5 of the roofing 2 in close proximity thereto to collect heated air sent from all the solar heat-collecting units 3a and conduct the heated air into the interior of the dwelling. Like the air feeder 13, heated air collector 14 has an opening formed on an inclined plane. Said opening communicates through packing with the air outlets of the solar heat-collecting units 3a.

Both air feeder 13 and heated air collector 14, though having a large volume, are generally fitted to the underside of the roofing 2, and are little likely to render the dwelling unattractive. As indicated by arrows in FIG. 3, air supplied from the air feeder 13 is brought to the underside of the partition plate 12, flows upward in that portion of the solar heat-collecting unit 3a which faces the eaves 6, runs through a passage containing a large number of fins, turns downward in that portion of said solar heat-colledting unit 3a which faces the ridge 5, and finally collected in the heated air collector 14 to be distributed into the interior of the dwelling 1. The above-mentioned hot air type room-heating system 14 has an arrangement schematically illustrated in FIG. 4.

According to this arrangement, the first blower 15 is operated, in the day time, to circulate air through a heat-charging route formed of the duct 16, solar heat collector 3 and heat-storage tank 21. Crushed stones 22 filled as packing in the heat-storage tank 21 absorb heat from the air heated while running through the solar heat collector 3, thereby charging said tank 21 with heat. The air whose heat has now been taken off travels through the duct 16 to be heated again in the solar heat collector 3.

Where the rooms 20 are to be heated by continuing the above-mentioned heat-storage operation, it is advised to operate a second blower 19 in order to conduct part of the air heated in the solar heat collector to a plenum chamber 23, and districute the heated air into the rooms 20. After circulating through the rooms 20, the discharged air is carried to the duct 16 through an outlet 18 and then back to the solar heat collector 3.

For example, at night when the heat charging route is not used at all, the first blower 15 is stopped. The second blower 19 alone is operated to send air from the rooms 20 into the heat storage tank 21 through the outlet 18. Thus, the air is heated from the crushed stones 22 used as packing in which solar heat has already been accumulated. The heated air is again conducted into the rooms 20 through the plenum chamber 23.

There will now be described the arrangement and operation of the hot water type solar heat collectors 4 which are provided, as shown in FIG. 1, on the outside of the hot air type solar heat collector 3, namely, in both horizontal edge portions of the roofing 2. Each hot water type solar heat collector 4 comprises a plurality of solar heat-collecting units 4a extending along the inclined plane of the roofing 2 from the ridge 5 to the eaves 6 in parallel at a prescribed space. Said solar heat-collecting units 4a are disposed between rafters 7 extending along the inclined plane of the roofing 2 from the ridge 5 to the eaves 6. There are also provided transparent plate 9 and solar heat-collecting plate 10.

The underside of the solar heat-collecting plate 10 is fitted with pipes 24 to flow water. Heat insulators 25 are provided below the heat-collecting plate 10 to prevent heat from escaping therefrom.

Figure 5:
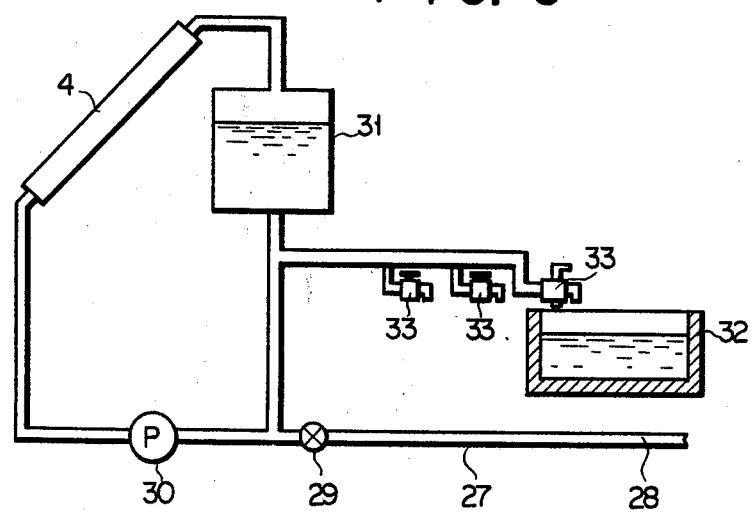
FIG. 5 schematically shows a hot water type room heating system.

A hot water feeder provided with the above-mentioned hot water type solar heat collectors 10 has a circulation system schematically illustrated in FIG. 5. One end of a water pipe 27 is connected to a water feeder 28. When a valve 29 provided on the water pipe 27 is opened, water is supplied from the water feeder 28. When a circulation pump 30 is operated, water is carried to the hot water type solar heat collector 4. While running through the heat transfer pipes 24, the water is heated by solar heat to become hot. The hot water is stored in a hot water tank 31. To raise the temperature of hot water, the hot water of the tank 31 is repeatedly sent to the solar heat collectors 4 with the valve 29 kept closed to shut off water supply from the water feeder 28. Where hot water is discharged from a cock 33 for use in a bath 32, washing machine, or kitchen, it is advised to supply cold water to the circulation system with the valve 29 opened to such extent as corresponds to the current level of hot water in the tank 31. Since hot water is used throughout the year, the hot water feeding system is not stopped for long periods of time.

As mentioned above, a dwelling embodying this invention which is designed for room heating and supply of hot water based on solar heat has hot air type solar heat collectors provided in that portion of the roofing which is positioned above the interior of the dwelling and hot water type solar heat collectors placed in one or both of the horizontal edge portion of the roofing, offering the following advantages:

(1) If water leaks from any part of the hot water type solar heat collecting system, said leakage occurs outdoors having, little tendency to soak for example, furniture;

(2) The hot air type solar heat collector is set in that portion of the roofing which is positioned directly above the interior of a dwelling, making it possible to arrange for example, piping of a blower possibly having a large size, air feeder, and heated air collector on the underside of the roofing in a manner so as to concealed from the outside, thereby preventing the dwelling from appearing unattractive.

Particularly, the air feeder and heated air collector need not be set outdoors, offering considerable convenience;

(3) In summer when room heating is not desired, the circulation system of the hot air type solar heat collector alone has to be stopped;

(4) The operation of, for example, valves and piping need not be changed over, enabling the entire heating apparatus to be easily operated;

(5) Both hot air and hot water type solar heat-collecting devices which are of simple arrangement can be easily assembled; and (6) Both hot air and hot water type solar heat-collecting devices are separately constructed in parallel to extend along the inclined plane of the underside of the roofing, offering convenience in providing the essential rainproof construction of the roofing.

A boundary between the hot air type solar heat-collecting device and either of the two hot water type solar heat-collecting devices should preferably lie right above the outer wall 26 of a dwelling or at a point in proximity thereto in order to practically realize the object of this invention.

Obviously numerous modifications and variations of the present invention are possible in light of the above teachings. It is therefore to be understood that within the scope of the appended claims, the invention may be practiced otherwise than as specifically described herein.

What we claim is:

1. A dwelling designed for room heating and supply of hot water based on solar heat, which comprises a dwelling body; roofing covering the dwelling body; a hot air type room-heating device including a plurality of hot air type solar heat collectors; a hot water feeding device including a plurality of hot water type solar heat collectors, and in which the roofing has a plane inclining downward from the ridge to the eaves, said inclining plane being divided into a first section lying directly above the dwelling and two second sections continuous to said first section and extending outward from the dwelling body; wherein said first section comprises a hot air type solar heat-collecting device formed of a plurality of narrow solar heat collectors extending from the ridge to the eaves of the roofing; and each of said two second sections comprises a hot water type solar heat-collecting device similarly formed of a plurality of narrow solar heat collectors extending from the ridge to the eaves separately provided and parallel to said solar heat-collectors of said hot air type solar heat-collecting device and including a boundary disposed between said two second sections and said first section, said boundary being coincident with said dwelling body so that no portion of the hot water type solar heat-collecting device is located above said dwelling body, thereby reducing the danger of water damage to the dwelling.

2. The dwelling according to claim 1, in which the inclined plane of the roofing is provided with a plurality of rafters extending from the ridge to the eaves in parallel at a prescribed distance; and the solar heat-collecting units are arranged between said rafters.

3. The dwelling according to claim 1, in which the hot air type room-heating device comprises an air feeder extending along the eaves under the inclined plane of the roofing to communicate with the hot air type solar heat-collecting units near the eaves, and a heated air-collecting chamber extending along the ridge under to roofing to communicate with the hot air type solar heat-collecting units.

4. The dwelling according to claim 1, which further comprises a source of air communicating with said heat collectors, a plurality of fin members provided on the back side of said heat collectors of said hot air type solar heat collectors and extending along the inclined plane of the roofing and metal partition plates secured to and disposed below said fin members so as to define a guide for conducting flowing air.

5. The dwelling according to claim 1, which further comprises a plurality of pipes fitted to the underside of said heat collectors of said hot water type solar heat collectors.

6. The dwelling according to claim 1, which further comprises;
a plurality of parallel fin members provided on the back side of said heat collectors of said hot air type solar heat collectors and extending along the inclined plane of the roofing.

7. The dwelling according to claim 1, which further comprises separate and independent recycling means connected to said heat collectors of said hot air type solar heat collectors and said hot water type solar heat collectors.

* * * * *